June 5, 1928.

W. A. DOBLE

REAR VISION MIRROR

Filed Nov. 19, 1923

1,672,559

Inventor

WILLIAM A. DOBLE.

By White Prost Evans

Louis J. Serventi his Attorneys

Patented June 5, 1928.

1,672,559

UNITED STATES PATENT OFFICE.

WILLIAM A. DOBLE, OF SAN FRANCISCO, CALIFORNIA, ASSIGNOR TO DOBLE STEAM MOTORS CORPORATION, OF WILMINGTON, DELAWARE, A CORPORATION.

REAR-VISION MIRROR.

Application filed November 19, 1923. Serial No. 675,443.

The invention relates to rear vision mirrors for use on automobiles for providing a view of the road behind the automobile.

The invention relates particularly to a rear vision mirror for use on a closed automobile having a fixed top, such for instance as the sedan and the limousine.

An object of the invention is to provide a rear view mirror for a closed automobile which will provide a view of the road for a long distance behind the car.

Another object of the invention is to provide a rear view mirror for the passengers occupying the rear seat of the automobile.

Another object of the invention is to provide a combined ventilator and rear vision mirror.

The invention possesses other advantageous features, some of which, with the foregoing, will be set forth at length in the following description, where I outline in full, that form of my invention which I have selected for illustration in the drawings accompanying and forming part of the present specification. In said drawings I have shown one form of rear view mirror embodying my invention, but it is to be understood that I do not limit myself to such form, since the invention, as set forth in the claim, may be embodied in a plurality of forms.

Referring to said drawings:—

The rear view mirror of my invention is particularly adapted to be used on closed cars. It has been the practice heretofore to arrange the rear view mirror within the car in front of and above the driver's head. The window in the back of the car ordinarily sets so low that the view reflected in the mirror and taken through the rear window of the automobile, only shows the roadway very close to the automobile, so that it is impossible for the driver to view the road for more than several hundred feet back of the automobile.

In accordance with my invention I have provided a rear view mirror which will give an unlimited view of the road behind the automobile. This I accomplish by arranging the mirror above the top of the car so that the line of reflected vision need not be inclined downward sharply to avoid the car body, as must be done when the line of reflected vision must pass through the rear window of the car. The rear view mirror of my invention may be arranged at the driving compartment to furnish the driver with a view of the road behind the car and may also when desired be arranged at the rear compartment so that the passengers in the rear may view the road behind the car without turning their heads to look through the rear window. It frequently happens that the passengers riding in the rear seat desire to view the road behind the car and, at the present time, this desire requires that they turn their heads to the rear. When desired the rear vision mirror of my invention may be arranged at the rear compartment only.

The rear vision mirror of my invention is arranged so that it serves the double function of providing a view of the road behind the automobile and of ventilating the car. Ventilators have been used in the roofs of closed automobiles and comprise a plate which is hinged at its forward end to the roof of the automobile and which may be raised so that it lies at an angle to the roof. As the car is moving, a reduction of pressure is formed behind the inclined plate and this reduction of pressure induces a current of air through the aperture in the automobile top over which the plate is disposed. In accordance with my invention I arrange a mirror on the under side of the plate, so that the device serves the double purpose of ventilating the car and providing a view of the road behind the car.

Figure 1:
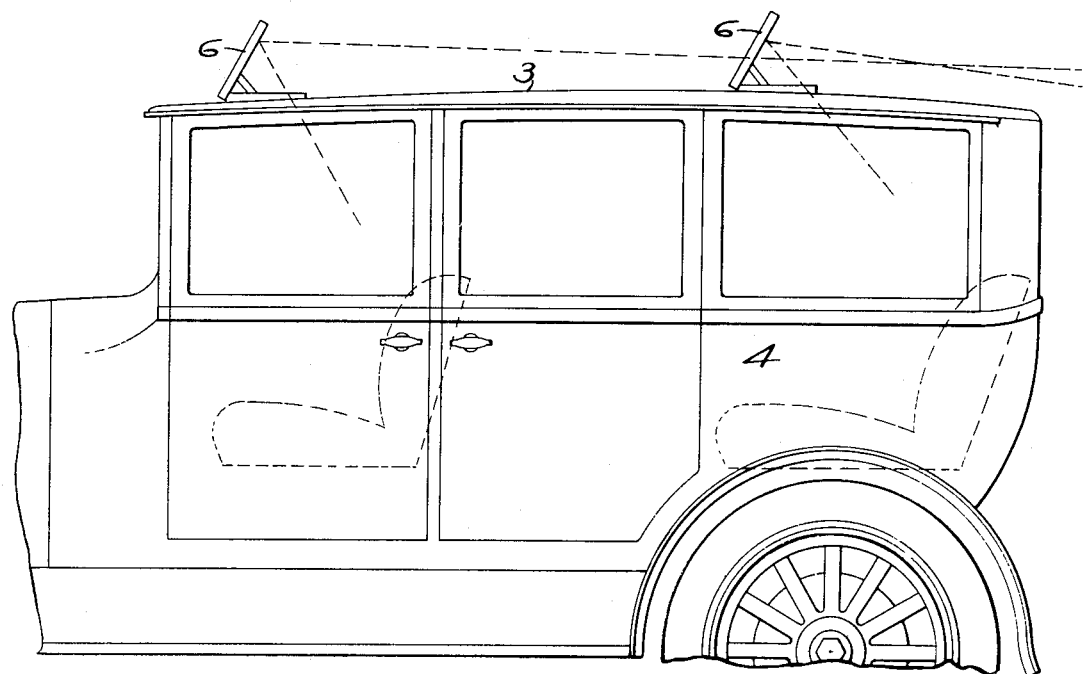
Figure 1 is a side elevation of a closed automobile body equipped with the rear vision mirror of my invention.
Figure 2:
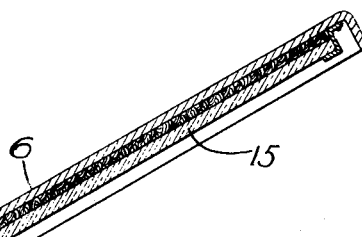
Figure 2 is a fragmentary section of the roof of a closed automobile body, showing the rear view mirror of my invention arranged thereon.
Figure 3:
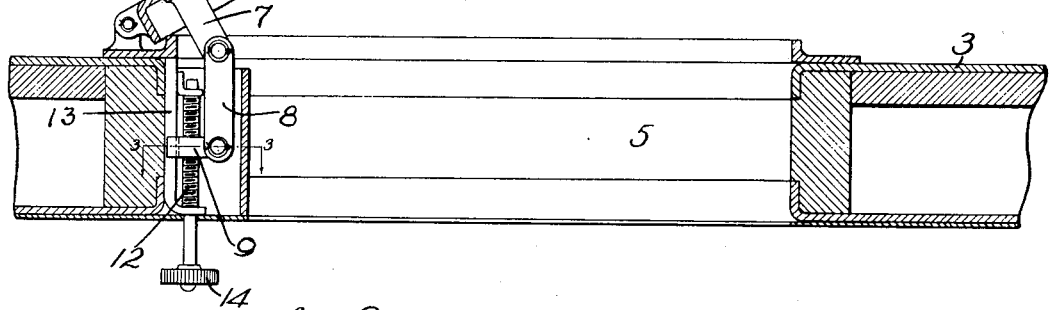
Figure 3 is a cross section taken on the line 3—3 Figure 2.

In Figure 1 of the drawings I have shown two rear view mirrors arranged on the closed body of the automobile and these may either be offset so that the rear mirror will not lie in the line of vision from the front mirror or the rear mirror holder may be closed when it is desired to use the front mirror. The roof 3 of the closed automobile body 4 is provided with an aperture 5 which may be closed by the plate 6 which is hinged to the roof at its forward end. Means are provided for moving the plate 6 about the hinge and for locking it in any adjusted position. Secured to the plate adjacent its hinged end is a projection 7 which is connected by the link 8, to the nut 9 which is movable along the threaded shaft 12. The nut is prevented from rotation by engagement with the bar 13 so that rotation of the shaft 12 by means of the thumb nut 14 causes vertical movement of the nut 9 and consequently movement of the plate 6 about its hinge. The plate 6 is hinged to the roof at its forward end and, when the plate is in an inclined position, the movement of the automobile causes a current of air to flow from within the closed body through the aperture 5. Arranged on the under side of the plate 6 is a mirror 15 in which, when the plate 6 is at the proper angle, a view of the road behind the automobile may be obtained. The person sitting in the car looks up through the aperture 5 at the mirror 15 and beholds a view of the road behind the car, when the plate 6 is adjusted at the proper angle. The angle of adjustment may be readily gauged to suit persons of different stature by merely rotating the thumb nut 14. By the provision of this means an unlimited view of the road behind the automobile is obtained without the necessity of constantly turning around to look through the rear window of the car.

I claim:

The combination with an automobile top having a plurality of apertures therein, of plates hinged at their forward edges to said top at said apertures, the plates serving in one position to close said apertures and in another position to be inclined to the top over said apertures, mirrors on the undersides of said plates for directly reflecting the rear conditions of the road, means for securing the plates in adjusted positions, said apertures and mirrors being positioned at a point above both the front and rear seats of an automobile and offset relative to one another, whereby both the driver and rear seat occupants are enabled to observe rear traffic conditions, substantially as described.

In testimony whereof, I have hereunto set my hand.

WILLIAM A. DOBLE.